US008676984B2

(12) United States Patent
Acharaya et al.

(10) Patent No.: US 8,676,984 B2
(45) Date of Patent: Mar. 18, 2014

(54) LIVE DIRECTORY OF CLOUD TENANTS TO ENABLE INTER-TENANT INTERACTION VIA CLOUD

(75) Inventors: Arup Acharaya, Hawthorne, NY (US); Nilanjan Banerjee, New Delhi (IN); Ajay Mohindra, Hawthorne, NY (US); Shachi Sharma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 13/479,055

(22) Filed: May 23, 2012

(65) Prior Publication Data

US 2013/0318241 A1 Nov. 28, 2013

(51) Int. Cl.
*G06F 15/16* (2006.01)

(52) U.S. Cl.
USPC .......................................... 709/226; 709/227

(58) Field of Classification Search
USPC .................................. 709/200–203, 217–227
See application file for complete search history.

(56) References Cited

U.S. PATENT DOCUMENTS

| 7,886,038 | B2 | 2/2011 | Ferris |
| 7,996,525 | B2* | 8/2011 | Stienhans et al. ............. 709/224 |
| 8,037,187 | B2 | 10/2011 | Dawson et al. |
| 8,117,317 | B2* | 2/2012 | Klimentiev et al. .......... 709/227 |
| 8,244,874 | B1* | 8/2012 | Thireault ....................... 709/226 |
| 8,316,139 | B2* | 11/2012 | Klimentiev et al. .......... 709/227 |
| 8,392,497 | B2* | 3/2013 | Vilke et al. .................... 709/202 |
| 8,473,620 | B2* | 6/2013 | Demmer et al. ............... 709/227 |
| 2010/0318665 | A1* | 12/2010 | Demmer et al. ............... 709/227 |
| 2011/0138050 | A1 | 6/2011 | Dawson et al. |
| 2011/0231840 | A1* | 9/2011 | Burch et al. ....................... 718/1 |
| 2011/0283017 | A1 | 11/2011 | Alkhatib et al. |
| 2011/0295727 | A1* | 12/2011 | Ferris et al. ...................... 705/34 |
| 2012/0030318 | A1* | 2/2012 | Ryder ............................. 709/220 |
| 2012/0124129 | A1* | 5/2012 | Klimentiev et al. .......... 709/203 |
| 2013/0219164 | A1* | 8/2013 | Hamid ............................ 713/150 |
| 2013/0268580 | A1* | 10/2013 | Vilke et al. .................... 709/203 |

OTHER PUBLICATIONS

Anonymous; "System and method for providing multi-tenancy cloud environment using OSGi services"; http://priorartdatabase.com/IPCOM/000205874; Apr. 6, 2011.

(Continued)

*Primary Examiner* — Moustafa M Meky
(74) *Attorney, Agent, or Firm* — F. Chau & Associates, LLC; Louis J. Percello, Esq.

(57) ABSTRACT

A system for enabling communication between multiple cloud-based services operating on a common cloud infrastructure includes a cloud infrastructure providing cloud-based services. The cloud-based services include a first service of a first tenant and a second service of a second tenant. A live directory is located within the cloud infrastructure and aggregates and distributing sharing and availability information pertaining to one or more of the cloud-based services. A back-end network is within the cloud infrastructure and enables communication between the cloud-based services and the live directory. A wide area network enables communication between the cloud-based services and one or more remote clients. The sharing and availability information pertaining to one or more of the cloud-based services aggregated and distributed by the live directory is used to establish a back-end connection between the first service of the first tenant and the second service of a second tenant.

22 Claims, 6 Drawing Sheets

(56) References Cited

OTHER PUBLICATIONS

IBM; "Common administration of tenant specific configuration profiles in different functional layers of a multi-tenant application"; http://www.ip.com/pubview/IPCOM000189053D; Oct. 26, 2009.

Anonymous; "System and method for virtualizing logging and tracing in a multi-tenant cloud environment including a logging query api"; http://priorartdatabase.com/----------------/IPCOM/000201734; Nov. 19, 2010.

Kaushik, RT.-et al.; "Evaluation and Analysis of GreenHDFS: A Self-Adaptive, Energy-Conserving Variant of the Hadoop Distributed File System"; Proceedings of the IEEE 2nd—International Conference on Cloud Computing Technology & Science (Cloudcom 2010); pp. 274-287; 2010.

\* cited by examiner

LIVE DIRECTORY OF CLOUD TENANTS TO ENABLE INTER-TENANT INTERACTION VIA CLOUD

TECHNICAL FIELD

The present disclosure relates to cloud-based computing and, more specifically, to a system and method for creating a live directory of cloud tenants to enable inter-tenant interaction via the cloud.

DISCUSSION OF THE RELATED ART

Organizations not wishing to expend the resources to establish and maintain their own hardware for hosting software applications may instead wish to lease hosted software applications. The leased hosted software may then be accessible over a wide area network (WAN) such as the Internet. The concept of leasing software as a service rather than purchasing and maintaining physical computer systems and then accession these services remotely over the Internet is often referred to as cloud-based computing.

The parties to a cloud-based computing arrangement generally include the host who is responsible to create and maintain the computing environment and the software that runs on it so that the software application is available over the wide area network. The tenant is the party that leases the software application from the host. The users are the people and machines that utilize the software application. The users may or may not be the tenants. For example, the tenants may commission the software application from the host for the benefit of third-party users, who may be customers of the tenant.

While the host may configure dedicated hardware for the serving of the software applications that the tenant has selected, the host may provision one or more virtual machines (VM) to execute the software applications. The VMs may then occupy one or more physical machines, either exclusively or by sharing the hardware resources with one or more other VMs. In this way, the host may operate a local area network (LAN) of physical computer systems and may then execute VMs for providing various software applications on the physical computer systems. Under such a configuration, the services leased by a given tenant may either share hardware resources with other tenants or may be otherwise closely connected to the services leased by other tenants. However, as the software servers leased by the tenants tend to be embodied as virtual machines, there is a high degree of isolation built into the arrangement. Thus even though two different tenants may utilize the same host and may even have their respective software applications running as distinct VMs on the same physical computer, the software of the two different tenants would not be able to communicate with one another through the LAN backend and instead, the software applications of the two tenants would only be able to communicate with each other by going through the greater wide area network (front-end) and not thorough the back-end, which may include the local area network that the host maintains.

SUMMARY

A system for enabling communication between multiple cloud-based services operating on a common cloud infrastructure includes a cloud infrastructure providing a plurality of cloud-based services. The plurality of cloud-based services includes a first service of a first tenant and a second service of a second tenant. A live directory is located within the cloud infrastructure and aggregates and distributing sharing and availability information pertaining to one or more of the plurality of cloud-based services. A back-end network is within the cloud infrastructure and enables communication between the plurality of cloud-based services and the live directory. A wide area network enables communication between the plurality of cloud-based services and one or more remote clients. The sharing and availability information pertaining to one or more of the plurality of cloud-based services aggregated and distributed by the live directory is used to establish a back-end connection between the first service of the first tenant and the second service of a second tenant.

The cloud infrastructure may include a plurality of physical computer systems for hosting the plurality of cloud-based services thereon. The plurality of cloud-based services may be hosted by one or more virtual machines executing on the plurality of physical computers. The plurality of physical computers may be connected to each other and to the live directory along a local area network which forms the back-end network. The cloud infrastructure may include a datacenter housing the plurality of physical computer systems.

The live directory may include a presence server. The live directory may include a database for storing the sharing and availability information. The sharing and availability information may include information pertaining to the availability of resources offered for sharing between each of the plurality of cloud-based services within the cloud infrastructure.

The sharing and availability information may include information pertaining to establishing a back-end connection between each of the plurality of cloud-based services within the cloud infrastructure.

The live directory may aggregate the sharing and availability information by periodically polling each of the plurality of cloud-based services. The live directory may aggregate the sharing and availability information by receiving the information from each of the plurality of cloud-based services as the information is generated. The live directory may distribute the sharing and availability information by publishing the information to the plurality of cloud-based services.

The established back-end connection between the first service of the first tenant and the second service of a second tenant may be a connection transmitting sound or video signals.

A method for enabling communication between multiple cloud-based services operating on a common cloud infrastructure includes aggregating sharing and availability information pertaining to a first cloud-based service of a plurality of cloud-based services within a cloud infrastructure. A second cloud-based service of the plurality of cloud-based services is accessed remotely via a front-end wide area network. The aggregated sharing and availability information is stored in a live directory within the cloud infrastructure. The stored sharing and availability information is retrieved from the live directory. Communication or collaboration between the first cloud-based service and the second cloud-based service is requested using the retrieved sharing and availability information. Communication or collaboration between the first cloud-based service and a second cloud-based service along a back-end local area network is provided using the retrieved sharing and availability information.

The provided communication or collaboration between the first cloud-based service and a second cloud-based service along a back-end local area network may include transmitting sound or video signals.

The aggregating of the sharing and availability information may be performed by the live directory. The sharing and availability information may include information pertaining to the availability of resources offered for sharing between each of the plurality of cloud-based services within the cloud infrastructure. The sharing and availability information may include information pertaining to establishing a back-end connection between each of the plurality of cloud-based services within the cloud infrastructure.

The cloud infrastructure may include a plurality of physical computer systems for hosting the plurality of cloud-based services thereon and the plurality of cloud-based services are hosted by one or more virtual machines executing on the plurality of physical computers.

Aggregating the sharing and availability information may include periodically polling each of the plurality of cloud-based services. Aggregating the sharing and availability information may include receiving the information from each of the plurality of cloud-based services as the information is generated.

A computer system includes a processor and a non-transitory, tangible, program storage medium, readable by the computer system, embodying a program of instructions executable by the processor to perform method steps for enabling communication between multiple cloud-based services operating on a common cloud infrastructure. The method includes aggregating sharing and availability information pertaining to a first cloud-based service of a plurality of cloud-based services within a cloud infrastructure. A second cloud-based service of the plurality of cloud-based services is accessed remotely via a front-end wide area network. The aggregated sharing and availability information is stored in a live directory within the cloud infrastructure. The stored sharing and availability information is retrieved from the live directory. Communication or collaboration between the first cloud-based service and the second cloud-based service is requested using the retrieved sharing and availability information. Communication or collaboration between the first cloud-based service and a second cloud-based service along a back-end local area network is provided using the retrieved sharing and availability information.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a system and method for multiple distinct tenants of a cloud infrastructure to interact across back-end channels, where available, so that the multiple distinct tenants hosted on the same cloud infrastructure do not need to go through the broader front-end to interact.

Figure 1:
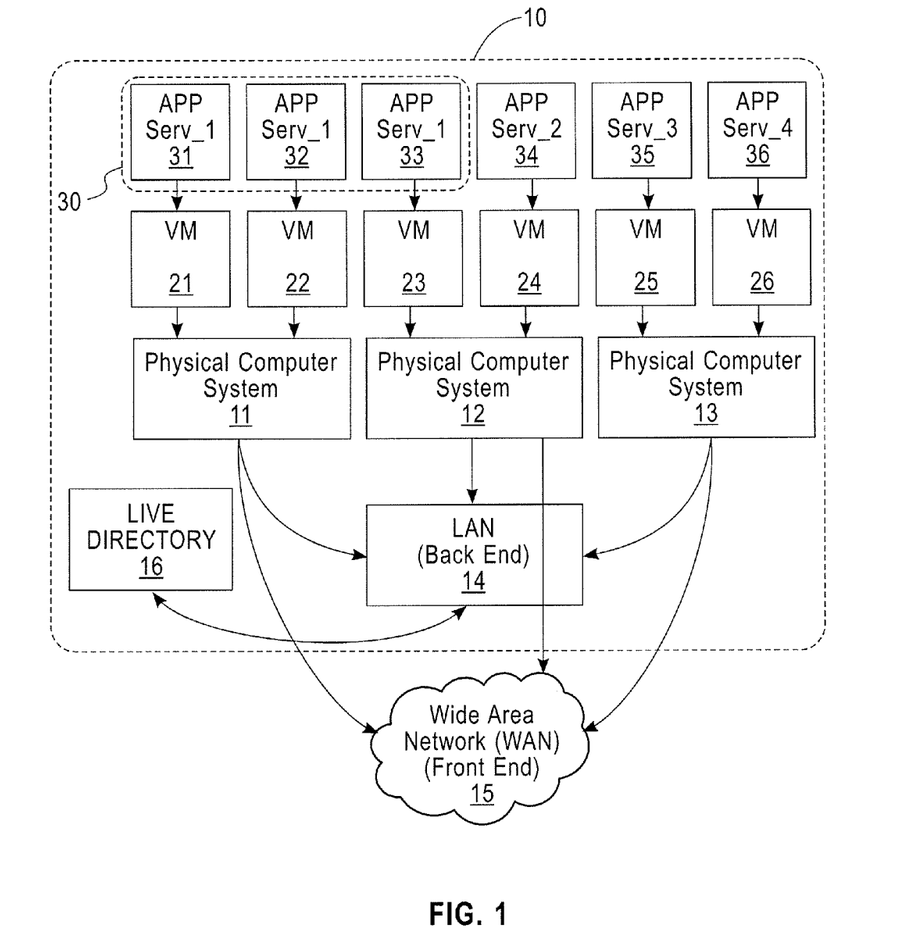
FIG. 1 is a block diagram illustrating a system for enabling inter-tenant interaction according to exemplary embodiments of the present invention.

FIG. 1 is a block diagram illustrating a system for enabling inter-tenant interaction according to exemplary embodiments of the present invention. As may be seen from the figure, a cloud infrastructure 10 may be provided. The cloud infrastructure 10 may include a set of one or more physical computer systems 11, 12, and 13 that are connected via a local area network (LAN) back end 14. The cloud infrastructure 10 may be maintained, for example, by a cloud service provider (CSP) engaged in the business of leasing cloud services to one or more tenants. For example, as illustrated in the figure, the cloud infrastructure 10 may include three physical computer systems, 11, 12, and 13 upon which various cloud services may be provided. Each of the physical computer systems 11, 12, and 13 may host one or more virtual machines (VMs) thereon.

A virtual machine is an installation of a guest operating system over a host operating system. The guest operating system may operate, from its own point of view, as if installed directly on a physical machine; however, the guest operating system is isolated from the physical machine by a hypervisor layer that manages the resources of the physical machine and makes these resources indirectly available to one or more guest operating systems while maintaining the illusion, from the point of view of the guest operating system, that it is executing directly on a physical machine.

For example, a first physical computer system 11 may execute two virtual machines, 21 and 22; a second physical computer system 12 may execute two virtual machines, 23 and 24; and a third physical computer system 13 may execute two virtual machines, 25 and 26. While three physical computer systems are shown as each executing two VMs, it should be understood that there may be any number of physical computer systems within the cloud infrastructure 10 and each physical computer system may execute any number of VMs.

Moreover, the cloud infrastructure 10 is not necessarily confined to a single data processing center. For example, the cloud infrastructure 10 may be distributed across multiple physical locations. Where the cloud infrastructure 10 is so distributed, the LAN back end 14 may be implemented across multiple locations either by a dedicated line of communication such as a T1 line or by securely tunneling over a WAN, for example, using a virtual private network (VPN).

Each physical computer system may include a hypervisor layer. Each VM 21-26 may execute a guest operating system through the hypervisor layer. Each VM 21-26 may also execute software for providing a particular service for a particular tenant. The tenant may be a person or institution leasing a cloud service from the CSP. The leased service of a particular tenant may involve multiple hosted software applications. These multiple hosted software applications may or may not share a physical computer system with each other and/or the hosted software applications pertaining to the leased services of another tenant.

For example, as illustrated, a first physical computer system 11 may run two VMs, 21 and 22, with the first VM 21 running a first application 31 that contributes to a first service Serv_1 30 and the second VM 22 running a second application 32 that also contributes to the first service Serv_1 30. In this case, the first service Serv_1 30 may also involve a third application 33 running on a first VM 23 of the second physical computer system 12. In this way, a single service may be provided by multiple applications running on distinct VMs on multiple computer systems.

There may also be a second service Serv_2 provided by a second application 34 executing on a second VM 24 of the second physical computer system 12. The third physical computer system 13 may execute two virtual machines 25 and 26 with the first VM 25 running an application 35 for providing a third service Serv_3 and with the second VM 26 running an application 36 for providing a fourth service Serv_4. Accordingly, as shown, each virtual machine may run one application but a given service leased by a tenant may include any number of applications running on any number of physical machines while each physical machine may host the applications of any number of different leased services.

Each service may be provided to one or more users via the wide area network (WAN) 15. The WAN may be, for example, the Internet. The users may or may not be the tenants themselves. For example, a tenant may lease a service for the benefit of users who are neither the tenant nor the CSP. As a given service leased by a tenant may involve multiple applications that may be hosted on multiple physical computer systems, for example, as shown for the first service Serv_1 30, the various applications contributing to the service may communicate with one another along the LAN back end 14.

Additionally, where the various applications for a common service are embodied as VMs on a common physical computer system, for example, as is the case with the applications 31 and 32, back-end communication may be handled by the hypervisor within the physical computer system rather than the LAN back end 14. However, in general, the applications for providing services to different customers are well isolated from one another so that each customer may enjoy many of the benefits traditionally associated with having a private physical computer system such as a high degree of security and reliability.

Exemplary embodiments of the present invention provide a way in which services of different tenants executing within a common cloud infrastructure can collaborate within the confines of the cloud infrastructure without having to communicate across the front end WAN. In this way, the CSP can provide an added benefit to those of its tenants that wish to collaborate. This collaboration may be performed within the back end LAN 14 or by hypervisor-managed communication between VMs embodied on a common physical computer system, for example, with the aid of a live directory 16.

The live directory 16 may be embodied on a presence server. A presence server is a service that may automatically and continuously aggregate information across a broad range of sources including devices, network elements and applications and make this aggregated information readily available to a variety of destinations including devices, network elements and applications, for example, by publishing the information for access by the destination devices or by allowing for the destination devices to subscribe to the information. When used to embody the live directory 16, the presence server may automatically and continuously aggregate information from the applications 31-36 within the cloud infrastructure 10. The aggregated information may include, for example, information pertaining to the availability of resources of the applications 31-36 that are shared to the applications 31-36 of other tenants within the cloud infrastructure.

Accordingly, the live directory 16 may include an architecture for pulling the desired sharing and availability information from the many applications and pushing this information back out to the many applications so that each application within the cloud infrastructure may be continuously aware of what resources are shared and the availability of the shared resources. The live directory may also include a database for storing the sharing and availability information. The architecture for pulling the information may then store the acquired information within the database while the architecture for pushing the information may retrieve the information to be pushed from the database.

As discussed above, live directory 16 may be embodied as a presence server. The presence server may either be hosted on independent hardware within the cloud infrastructure or may be embodied on a virtual machine running on a physical computer system within the cloud infrastructure, for example, on one of the physical computer systems 11-13 that the tenant applications 31-36 are hosted on.

The live directory may therefore communicate with the applications 31-36 across the LAN backend 14 or via hypervisor-managed communication between VMs embodied on a common physical computer system, where the presence server is embodied as a VM running on a common physical computer system as the applications it is in communication with.

The sharing and availability information acquired by the presence server and stored in the database may include, for example, a list of tenants participating in the ability to share resources within the cloud infrastructure, a set of services and/or functionality that may be shared, constraints and/or limitations on the use of the services, present state of availability of the shared resources, and information pertaining to how to establish the appropriate connection along the LAN back end.

Figure 2:
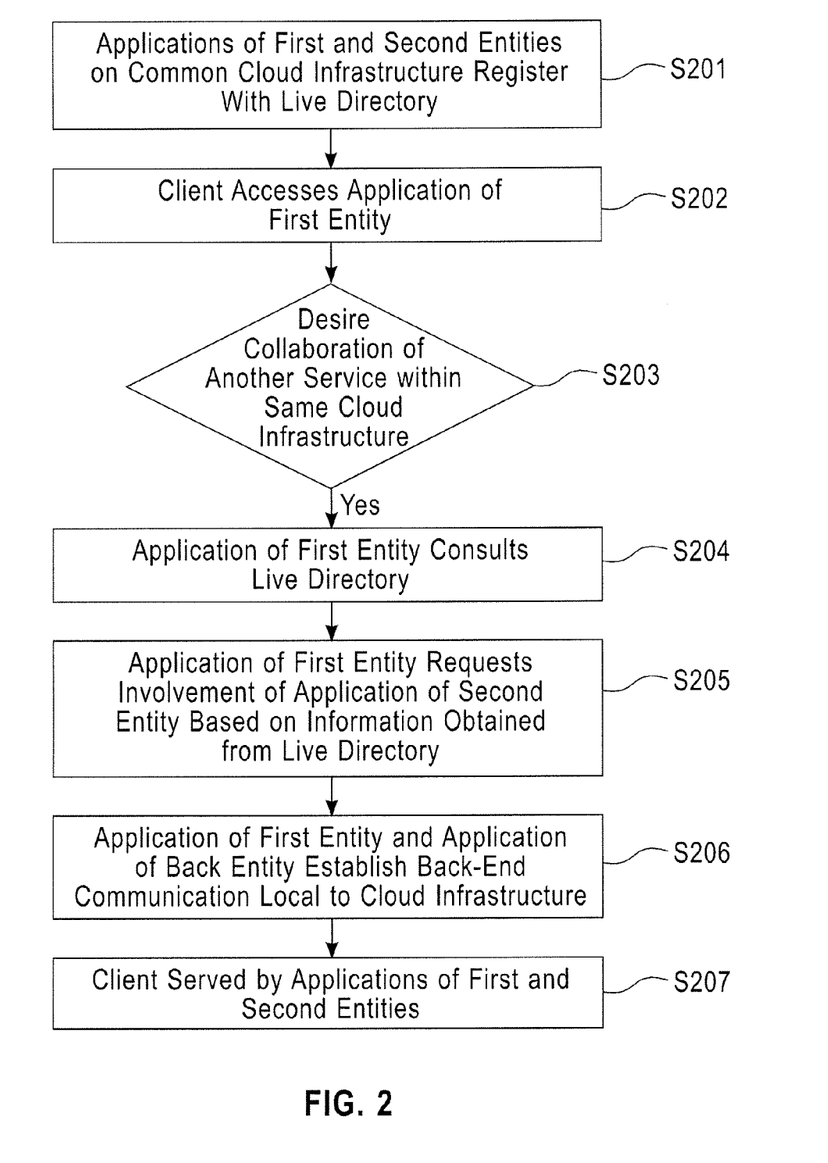
FIG. 2 is a flowchart illustrating a method for inter-tenant collaboration within a cloud infrastructure according to exemplary embodiments of the present invention.

FIG. 2 is a flowchart illustrating a method for inter-tenant collaboration within a cloud infrastructure according to exemplary embodiments of the present invention. The services of two or more tenants within a common could infrastructure may first be registered with a live directory (Step S201). Registration may be performed either by the tenant submitting sharing and availability information directly to the live directory or by the tenant activating or otherwise opting to participate in sharing within the cloud infrastructure followed by the live directory polling and discovering the participation of the tenant.

A client may then access one of the services hosted within the cloud infrastructure (Step S202). The client may be, for example, a human user, although this is not a requirement. The client may be any entity that calls upon the particular service.

The client may proceed to avail itself of the particular service. When it is determined that the client or the particular service requires or otherwise desires collaboration of another service within the same cloud infrastructure (Yes, Step S203), the particular service can consult the live directory to obtain sharing and availability information pertaining to the desired other service (Step S204). Consultation with the live directory may include actively querying the database of the live directory or receiving the sharing and availability information pertaining to the desired other service as part of an information subscription. If so subscribed, the sharing and availability information pertaining to the desired other service may be pushed down or otherwise made available either periodically or as information is created and/or changed.

Upon obtaining the pertinent sharing and availability information, the particular service may use connection information within the sharing and availability information to request a back-end connection with the desired other service, for example through the LAN (Step S205). This request of the connection may include the sending of a request for collaboration or for a shared resource from the particular service to the desired other service. Thereafter, if the request is accepted by the desired other service, a suitable connection for collaboration and/or the sharing of a service between the services may be established along the back end LAN that is local to the common cloud infrastructure (Step S206). The established connection may thereafter be used for the collaboration and/or the sharing of a service between the particular service and the desired other service (Step S207).

The established back-end line of communication between different tenant services within a common cloud infrastructure may be used for multiple significant purposes. For example, it may often be the case that two tenants may wish to serve the interests of common customers and in such cases, collaboration between the services of the two tenants may be desirable. For example, two tenant companies, a mobile phone manufacturer and a mobile phone carrier may each provide customer services to their respective customers using a cloud-based contact center service. The two tenant companies may utilize a common CSP for providing their respective cloud-based contact center services. Because there may be substantial overlap in the types of problems encountered by the contact centers of the two tenant companies, it may be desirable for the customer service representative of the mobile phone carrier to bring in a customer service representative of the mobile phone manufacturer or tap into the knowledge base of the mobile phone manufacturer.

Traditionally, there has been no convenient and efficient way in which the fact that the two companies utilize cloud-based services within the same cloud infrastructure could be leveraged to provide greater interoperability and efficiency than would be available has the two companies utilized distinct cloud-based services. By establishing the above-described live directory, added benefit may be gained from the fact that the two companies utilize a common cloud infrastructure. In particular, communication and collaboration may occur across the back-end connection thereby more easily allowing for high-bandwidth communication such as videoconferencing and the efficient transfer of large files.

Figure 3:
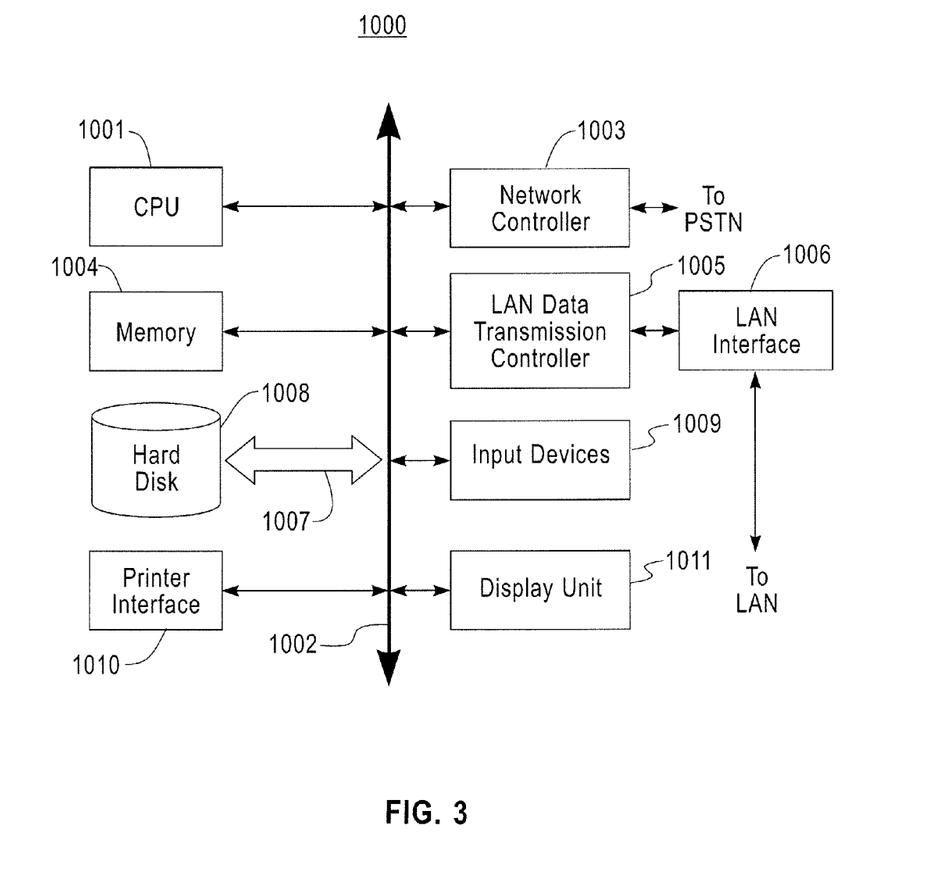
FIG. 3 shows an example of a computer system capable of implementing the method and apparatus according to embodiments of the present disclosure.

FIG. 3 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email).

The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications.

The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
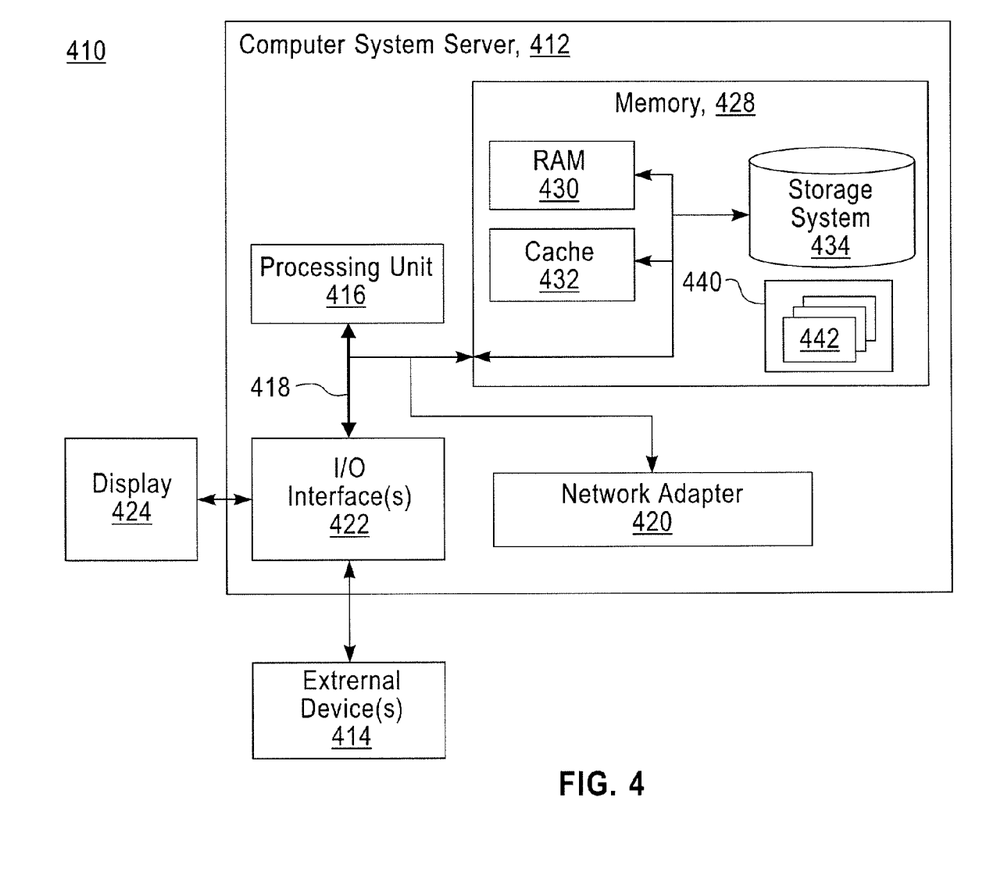
FIG. 4 depicts a cloud computing node according to an embodiment of the present invention.

Referring now to FIG. 4, a schematic of an example of a cloud computing node is shown.

Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
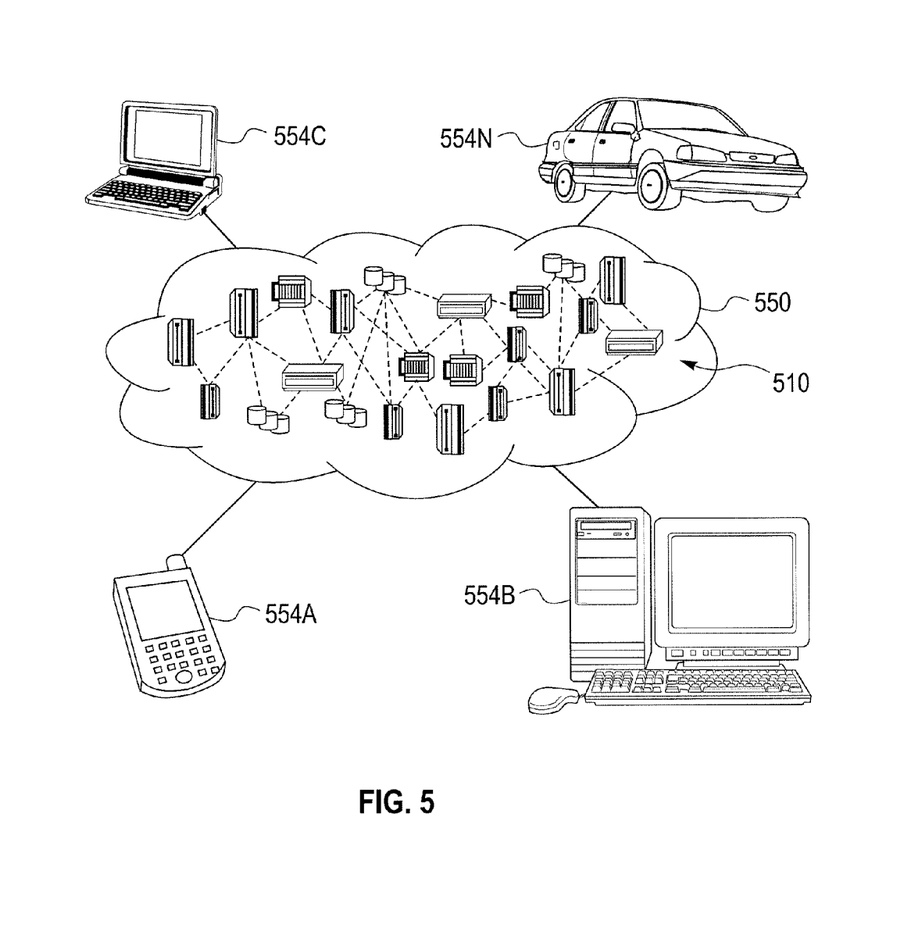
FIG. 5 depicts a cloud computing environment according to an embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
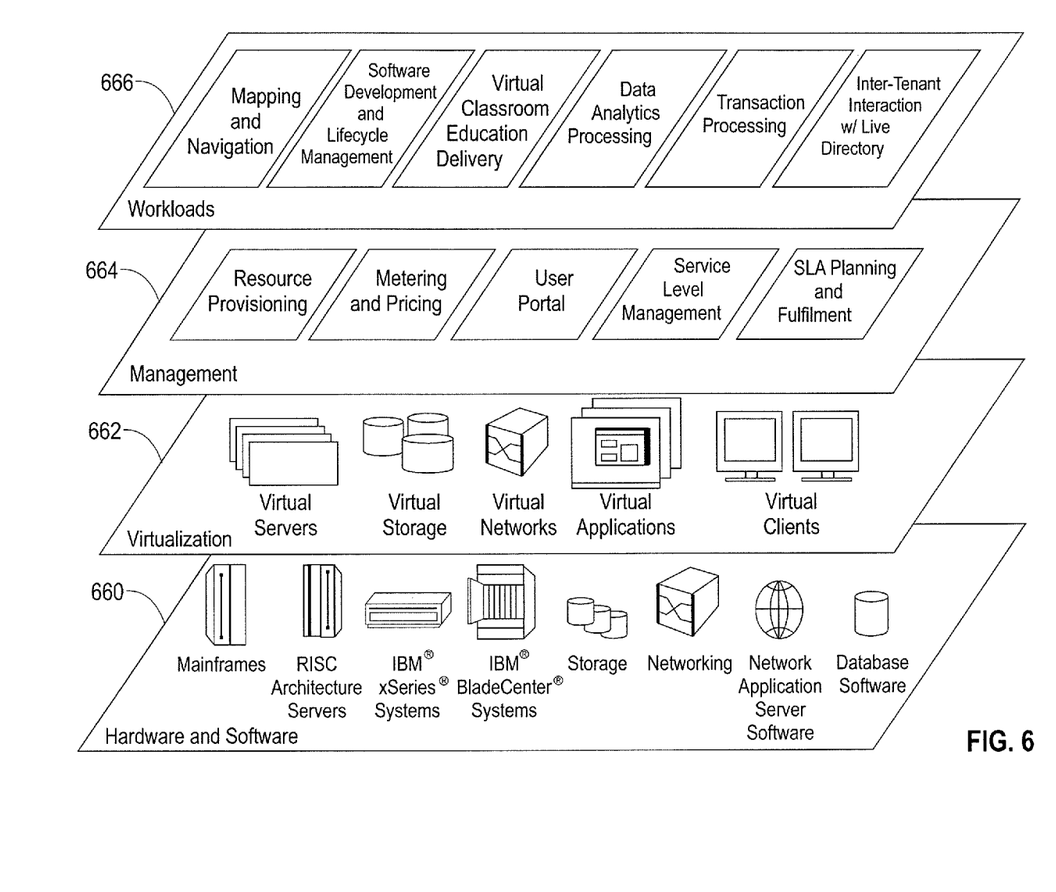
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described herein. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and inter-tenant interaction using a live directory.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for enabling communication between multiple cloud-based services operating on a common cloud infrastructure, comprising:
    a cloud infrastructure providing a plurality of cloud-based services, the plurality of cloud-based services including a first service of a first tenant and a second service of a second tenant;
    a live directory located within the cloud infrastructure for aggregating and distributing sharing and availability information pertaining to one or more of the plurality of cloud-based services;
    a back-end network within the cloud infrastructure enabling communication between the plurality of cloud-based services and the live directory; and
    a wide area network enabling communication between the plurality of cloud-based services and one or more remote clients,
    wherein the sharing and availability information pertaining to one or more of the plurality of cloud-based services aggregated and distributed by the live directory is used to establish a back-end connection between the first service of the first tenant and the second service of a second tenant.

2. The system of claim 1, wherein the cloud infrastructure includes a plurality of physical computer systems for hosting the plurality of cloud-based services thereon.

3. The system of claim 2, wherein the plurality of cloud-based services are hosted by one or more virtual machines executing on the plurality of physical computers.

4. The system of claim 2, wherein the plurality of physical computers are connected to each other and to the live directory along a local area network which forms the back-end network.

5. The system of claim 2, wherein the cloud infrastructure includes a datacenter housing the plurality of physical computer systems.

6. The system of claim 1, wherein the live directory includes a presence server.

7. The system of claim 1, wherein the live directory includes a database for storing the sharing and availability information.

8. The system of claim 1, wherein the sharing and availability information includes information pertaining to the availability of resources offered for sharing between each of the plurality of cloud-based services within the cloud infrastructure.

9. The system of claim 1, wherein the sharing and availability information includes information pertaining to establishing a back-end connection between each of the plurality of cloud-based services within the cloud infrastructure.

10. The system of claim 1, wherein the live directory aggregates the sharing and availability information by periodically polling each of the plurality of cloud-based services.

11. The system of claim 1, wherein the live directory aggregates the sharing and availability information by receiving the information from each of the plurality of cloud-based services as the information is generated.

12. The system of claim 1, wherein the live directory distributes the sharing and availability information by publishing the information to the plurality of cloud-based services.

13. The system of claim 1, wherein the established back-end connection between the first service of the first tenant and the second service of a second tenant is a connection transmitting sound or video signals.

14. A method for enabling communication between multiple cloud-based services operating on a common cloud infrastructure, comprising:
   aggregating sharing and availability information pertaining to a first cloud-based service of a plurality of cloud-based services within a cloud infrastructure;
   accessing a second cloud-based service of the plurality of cloud-based services remotely via a front-end wide area network;
   storing the aggregated sharing and availability information in a live directory within the cloud infrastructure;
   retrieving the stored sharing and availability information from the live directory;
   requesting communication or collaboration between the first cloud-based service and the second cloud-based service using the retrieved sharing and availability information; and
   providing communication or collaboration between the first cloud-based service and a second cloud-based service along a back-end local area network using the retrieved sharing and availability information.

15. The method of claim 14, wherein the provided communication or collaboration between the first cloud-based service and a second cloud-based service along a back-end local area network includes transmitting sound or video signals.

16. The method of claim 14, wherein the aggregating of the sharing and availability information is performed by the live directory.

17. The method of claim 14, wherein the sharing and availability information includes information pertaining to the availability of resources offered for sharing between each of the plurality of cloud-based services within the cloud infrastructure.

18. The method of claim 14, wherein the sharing and availability information includes information pertaining to establishing a back-end connection between each of the plurality of cloud-based services within the cloud infrastructure.

19. The method of claim 14, wherein the cloud infrastructure includes a plurality of physical computer systems for hosting the plurality of cloud-based services thereon and the plurality of cloud-based services are hosted by one or more virtual machines executing on the plurality of physical computers.

20. The method of claim 14, wherein aggregating the sharing and availability information includes periodically polling each of the plurality of cloud-based services.

21. The method of claim 14, wherein aggregating the sharing and availability information includes receiving the information from each of the plurality of cloud-based services as the information is generated.

22. A computer system comprising:
   a processor; and
   a non-transitory, tangible, program storage medium, readable by the computer system, embodying a program of instructions executable by the processor to perform method steps for enabling communication between multiple cloud-based services operating on a common cloud infrastructure, the method comprising:
   aggregating sharing and availability information pertaining to a first cloud-based service of a plurality of cloud-based services within a cloud infrastructure;
   accessing a second cloud-based service of the plurality of cloud-based services remotely via a front-end wide area network;
   storing the aggregated sharing and availability information in a live directory within the cloud infrastructure;
   retrieving the stored sharing and availability information from the live directory;
   requesting communication or collaboration between the first cloud-based service and the second cloud-based service using the retrieved sharing and availability information; and
   providing communication or collaboration between the first cloud-based service and a second cloud-based service along a back-end local area network using the retrieved sharing and availability information.

* * * * *